United States Patent
De Velder et al.

(10) Patent No.: US 8,354,475 B2
(45) Date of Patent: Jan. 15, 2013

(54) EPOXY-PHENOLIC RESINS CO-DISPERSIONS

(75) Inventors: Helga De Velder, Ottignies Louvain-la-Neuve (BE); Alain Leroy, Ottignies Louvain-la-Neuve (BE)

(73) Assignee: Momentive Specialty Chemicals Inc., Columbus, OH (US)

( * ) Notice: Subject to any disclaimer, the term of this patent is extended or adjusted under 35 U.S.C. 154(b) by 0 days.

(21) Appl. No.: 12/740,169

(22) PCT Filed: Dec. 9, 2008

(86) PCT No.: PCT/EP2008/010447
§ 371 (c)(1),
(2), (4) Date: Jun. 30, 2010

(87) PCT Pub. No.: WO2009/074293
PCT Pub. Date: Jun. 18, 2009

(65) Prior Publication Data
US 2010/0267887 A1  Oct. 21, 2010

(30) Foreign Application Priority Data
Dec. 12, 2007  (EP) .................................... 07024055

(51) Int. Cl.
*C08L 61/06* (2006.01)
*C08L 63/00* (2006.01)
(52) U.S. Cl. ........................................ 525/396; 524/501
(58) Field of Classification Search .................. 524/503, 524/501; 525/396
See application file for complete search history.

(56) References Cited

U.S. PATENT DOCUMENTS

| | | | |
|---|---|---|---|
| 3,491,092 A | 1/1970 | Wedemeyer et al. | |
| 4,073,762 A * | 2/1978 | Hosoda et al. | ................ 523/403 |
| 4,115,328 A | 9/1978 | Bozzi et al. | |
| 4,124,554 A * | 11/1978 | Fry | ................ 523/412 |
| 4,315,766 A | 2/1982 | Hamprecht et al. | |
| 4,507,428 A | 3/1985 | Higginbottom et al. | |
| 4,524,107 A | 6/1985 | Marchetti et al. | |
| 4,607,091 A | 8/1986 | Schreiber | |
| 5,118,323 A | 6/1992 | Lim et al. | |
| 5,200,455 A | 4/1993 | Warren | |
| 5,908,902 A | 6/1999 | Pfeil et al. | |
| 6,080,813 A | 6/2000 | Wendel et al. | |
| 6,376,080 B1 | 4/2002 | Gallo | |
| 8,026,300 B2 * | 9/2011 | Romahn et al. | ................ 524/1 |
| 2003/0038031 A1 | 2/2003 | Nojiri et al. | |
| 2003/0088025 A1 | 5/2003 | Ogawa et al. | |
| 2003/0091800 A1 | 5/2003 | Zhang | |
| 2010/0144941 A1 | 6/2010 | Kuhlmann | |

FOREIGN PATENT DOCUMENTS

| | | |
|---|---|---|
| DE | 2323936 | 6/1973 |
| EP | 0019161 | 11/1980 |
| EP | 0458739 | 11/1991 |
| EP | 1046683 | 10/2000 |
| EP | 1264851 | 11/2002 |
| JP | 58027716 | 2/1983 |
| JP | 07-329090 | 12/1995 |
| JP | 2000191808 | 7/2000 |
| JP | 2004027000 | 1/2004 |
| JP | 2005-281487 | 10/2005 |
| WO | WO2007/118645 | 10/2007 |
| WO | WO 2007/118645 A1 | 10/2007 |

OTHER PUBLICATIONS

Air Products and Chemicals, Inc., Material Safety Data sheet for SURFYNOL TG Surfactant, Nov. 26, 2003, Air Products, and Chemicals, Inc.
Dow Chemical, Inc., Crystallization of Liquid Epoxy Resins, Dec. 2007, Dow Chemical, Inc.

* cited by examiner

*Primary Examiner* — Kelechi Egwim

(57) ABSTRACT

An organic solvent free process to make an aqueous co-dispersion of epoxy resins and at least phenolic novolac resins is reported. The compositions of such co-dispersions are based on blends of epoxy resins and at least a phenolic novolac resin within the profile viscosity versus temperature in the ranges from 1 500 000 to 300 mPas at 80° C. and 10 000 to 20 mPas at 120° C.

5 Claims, No Drawings

EPOXY-PHENOLIC RESINS CO-DISPERSIONS

RELATED APPLICATION DATA

This application claims the benefit of PCT Application PCT/EP2008/010447 with an International Filing Date of Dec. 9, 2008, published as WO 2009/074293 A1, which further claims priority to European Patent Application No. EP07024055.1 filed Dec. 12, 2007, the entire contents of both are hereby incorporated by reference.

This invention relates to a process to prepare an aqueous co-dispersion of epoxy resins and phenolic novolac resin and the specific compositions of such a co-dispersion.

Epoxy resins are used already for a long time and different vehicles (solvent, powder) have been tried. Due to environmental concern the development of aqueous system has been more and more proposed to the industry for several types of end applications.

The U.S. Pat. No. 6,221,934 describes stable aqueous emulsions of epoxy resins by using an epoxy-functional surfactant prepared by reacting an amidoamine with the epoxy groups. The epoxy resin is further cured with an amine water compatible oligomer.

Further, attention has been directed to various emulsifiers which are adapted for emulsification of epoxy resins in water. For example, an aqueous emulsion of an epoxy resin in which a reaction product of a boric acid ester derived from boric acid with both an alkylene glycol and a .beta.-dialkyl-substituted aminoalkanol is employed as an emulsifier is described in U.S. Pat. No. 3,301,804. A polyepoxide emulsion for electrodeposition in which a polyepoxide is emulsified with an emulsifying agent of the phosphate ester type is described in U.S. Pat. No. 3,634,348. An epoxy resin emulsion for sizing glass fibers in which a cationic emulsifying agent selected from the group consisting of imidazolines and amides and a non-ionic emulsifying agent are used in combination in U.S. Pat. No. 3,249,412.

Also, various curing agents for epoxy resin emulsion compositions are known in the art. For example, curing agents for epoxy resin compositions include a polyamide reaction product derived from a polymeric fatty acid and an aliphatic polyamine containing terminal amino groups (U.S. Pat. No. 2,811,495 and U.S. Pat. No. 2,899,397), a salted amine derived from a carboxylic acid having 1-8 carbon atoms and a tertiary amine (U.S. Pat. No. 3,640,926), a polyamide derived from a diamine and a dicarboxylic acid (U.S. Pat. No. 3,355,409), a phenol modified polyamine (U.S. Pat. No. 3,383,347), an amino-containing polyamide prepared by reacting a polyamine with a polymerized fatty acid (U.S. Pat. No. 3,324,041).

The limitation of the above prior art is that the process to produce an aqueous formulation requires several chemical reactions and such formulations are designed to be cured with amines or polyamides at ambient temperature or at 50-60° C., the composition of curing agent and epoxy emulsion is not stable on storage at ambient temperature (20° C.). The industry is still looking for an aqueous composition epoxy and curing agent stable on storage over long period of time. The epoxy resin can be reacted with an acid (or anhydride), with thio-compounds and phenolic resins.

Other curing agents can be used examples of such crosslinker are the aminoplast and phenolplast resins. Suitable aminoplast resins are methylol urea, dimethoxymethylol urea, butylated polymeric urea-formaldehyde resins, hexamethoxymethyl melamine, methylated polymeric melamine-formaldehyde resins and butylated polymeric melamine-formaldehyde resins. The major drawback of such composition is the generation of free formaldehyde upon cure, the industry wish to avoid this drawback.

U.S. Pat. No. 4,073,762 describes an aqueous epoxy resin paint composition comprising an epoxy resin emulsion formed by emulsifying in water (a) 98 to 50% by weight of a bisphenol type epoxy resin and (b) 2 to 50% by weight novolac type epoxy resins, with a non-ionic surfactant, and a curing agent incorporated in said epoxy resin emulsion.

This invention relates to an aqueous epoxy resin composition in which the above-mentioned defects involved in conventional techniques are overcome.

Objects of this invention are as follows:
(1) an organic solvent free process to make an aqueous co-dispersion of epoxy resins and at least phenolic novolac resins,
(2) a process to make an aqueous co-dispersion of epoxy resins and phenolic novolac resins consisting in the following steps:
   (a) heat the epoxy resins at temperature ranging from 80-120° C. add the phenolic novolac resins
   (b) at a temperature below 100° C. add the surfactant and the water quantity, or
   (a) heat the epoxy resins at a temperature ranging from 80-120° C.
   (b) at temperature below 100° C. add the surfactant and the inversion water quantity,
   (c) at a temperature below 100° C. add the phenolic novolac resins and dilution water
(3) a composition comprising epoxy resins, at least a phenolic novolac resin and a non-ionic surface active agent, and water
(4) the above compositions in the presence of a cure catalyst are especially useful in heat cure coating (on metal, paper, wood, plastics), fiber sizing, adhesives, binder for abrasive, saturant for filter (fibers, paper) woven and non-woven binder applications.

The composition of the invention for application purposes may also contain solvents, pigments, fillers and additives known from the skilled person in the art.

The epoxy resins useful for the invention are based on: bisphenol type epoxy resin obtained by condensation between bisphenol A [2,2-bis(4'hydroxyphenyl)-propane] or bisphenol F and epichlorohydrin or the like. Commercially available bisphenol type epoxy resins are liquid or solid and have a molecular weight of about 350 to about 3750 and an epoxy equivalent of about 180 to about 3500. Typical instances of these commercially available bisphenol type epoxy resins are as follows: Epikote 862, Epikote 828, Epikote 834, Epikote 1001, Epikote 1004, Epikote 1007 and Epikote 1009, Epikote YX4000 (trademarks for products manufactured by Hexion Specialty Chemicals Inc.); DER 330, DER 331, DER 334, DER 337, DER 661, DER 664, DER 667 and DER 669 (Dow Chemical Co.); Araldite GY250, Araldite GY252, Araldite GY260, Araldite GY280, Araldite GY6071, Araldite GY6084, Araldite GY6097 and Araldite GY6099 (Huntsman Chemical; Epiclon 850 (Dainippon Ink and Chemicals Incorp.) These commercially available bisphenol type epoxy resins can be used singly, or mixtures of two or more of them can also be employed.

Other epoxy resins with an epoxy functionality higher than two are generally prepared by reacting a phenolic novolac type resin with epichlorohydrin.

As commercially available epoxy novolac type resins, there can be mentioned Epikote 154 (epoxy equivalent of 176-181), DEN 431 (epoxy equivalent of 172-179), DEN 438 (epoxy equivalent of 175-182), EPN 1138 (epoxy equivalent of 172-179), and the like.

Cycloaliphatic epoxies can be used, examples of cycloaliphatic epoxies include, for example, 3,4-epoxycyclohexylmethyl(3,4-epoxy)cyclohexane carboxylate, dicyclo aliphatic diether diepoxy [2-(3,4-epoxy)cyclohexyl-5,5-spiro(3,4-epoxy)-cyclohexane-m-dioxane], bis(3,4-epoxycyclohexylmethyl)adipate, bis(3,4-epoxycyclohexyl)adipate and vinylcyclohexene dioxide [4-(1,2-epoxyethyl)-1,2-epoxycyclohexane]. Commercial examples of such epoxy resins include, for example, EPONEX Resin 1510, HELOXY Modifiers 32, 44, 48, 56, 67, 68, 71, 84, 107, 505, all available from Hexion Specialty Chemicals Inc, and Union Carbide Epoxy Resins ERL-4221, -4289, -4299, -4234 and -4206.

The co-dispersed phenolic novolac resins are based on the reaction products of phenols and aldehydes in presence of acid catalyst such as the aromatic units are linked by methylene bridges and that the phenolic group is maintained. These compositions can be monomeric or polymeric in nature depending on the molar ratio of phenol to aldehyde used in the initial condensation reaction. Examples of suitable phenols are phenol, o, m or p-cresol, 2,4-xylenol, 3,4-xylenol, 2,5-xylenol, cardanol, p-tert-butyl phenol, dihydric phenols are 2,2-bis(4-hydroxyphenyl)propane, 2,2-bis(3-bromo-4-hydroxyphenyl)-propane, 2,2-bis(3,5-dichloro-4-hydroxyphenyl)propane, 2,2-bis(3-chloro-4-hydroxyphenyl)propane, bis(4-hydroxyphenyl)-methane, bis(4-hydroxyphenyl)sulfone, bis(4-hydroxyphenyl)sulfide, resorcinol, hydroquinone, and the like. The preferred dihydric phenols are 2,2-bis(4-hydroxyphenyl)propane (bisphenol A) and bis(4-hydroxyphenyl)methane for reasons of cost and availability and the like. Useful aldehydes are formaldehyde, acetaldehyde and propionaldehyde.

Other type of curing agents such as linear phenolic resins from low and high molecular weight, Epikure 168 (ex Hexion Specialty Chemicals) or benzoxazine resins or a combination thereof can be used.

As the non-ionic surface active agent, there can be mentioned, for example, derivatives of polyethylene and/or polypropylene glycol, ethylene vinyl alcohol copolymer and/or polymers with free hydroxyl groups, such as polymers based on partially hydrolysed polyvinyl alcohol give particularly good results. Commercially available product such as Rhodoviol, Polyviol, Mowiol, Airvol, Cuvol, Premiol, Poval, Mowital, Exceval.

The process according the present invention is possible for blends of epoxy resins and phenolic novolac resins within the profile viscosity versus temperature as set in the ranges below:
1,500,000 to 300 mPas at 80° C. and 10 000 to 20 mPas at 120° C. or more preferred 250 000 to 100 mPas at 90° C. and 20 000 to 30 mPas at 110° C.

The above viscosity range is obtained by a blend of epoxy resins of high or low molecular weight (high and low viscosity) and at least a phenolic novolac from high or low molecular weight.

The molar ratio appropriated for the process used below and the properties of the cured formulation is as: epoxy resin/phenolic novolac resin mole ratio from 0.45/1 to 1/0.45 or more preferred from 0.45/1 to 1/0.70.

The curing catalysts used in the invention are amine derivatives such as imidazoles or salts thereof, phosphine or phosphonium salts, blocked urones, amino-acids and the like known catalysts in the art to catalyze the reaction epoxy-phenol.

EXAMPLES

The examples in Table 1 illustrate the invention and they are made according to the following processes:
Epoxy resins and phenolic novolac resins are mixed together at elevated temperature, ranging from 80 to 120° C.
At a temperature <100° C., surfactant and water are charged into the reactor.
or
(a) heat the epoxy resins at a temperature ranging from 80-120° C.
(b) at temperature below 100° C. add the surfactant and the inversion water quantity,
(c) at a temperature below 100° C. add the phenolic novolac resins and dilution water.

By application of the above processes steps, the co-dispersion properties are given in tables 1-3.

TABLE 1 composition and properties of the co-dispersions

|  | Example | | | | |
|---|---|---|---|---|---|
|  | 1 | 2 | 3 | 4 | 5 |
| Composition co-dispersion (on solids) | | | | | |
| Epikote 1001 MSQ (%) | 62.65 | 64.75 | 77.90 | 79.80 | 79.80 |
| PH 0205 DF 04 (low MW) (%) | 26.85 | 27.75 | 17.10 | 15.20 | — |
| PH 0205 DF 01 (high MW) (%) | — | — | — | — | 15.20 |
| Surface active agent (%) | 10.50 | 7.50 | 5.00 | 5.00 | 5.00 |
| Epoxy/Phenolic stochiometry | 0.46/1 | 0.46/1 | 0.9/1 | 1/1 | 1/1 |
| Properties co-dispersion | | | | | |
| EGC (mmol/kg) | 1138 | 1156 | 1743 | 1516 | 1476 |
| Solids content (%) | 45.0 | 50.1 | 59.3 | 56.7 | 58.7 |
| Viscosity @ 25° C. (mPa · s) | 5900 | 1820 | 5400 | 5520 | 980 |
| Particle Size, Dv* | 0.29 | 0.95 | 0.97 | 0.99 | 1.40 |
| Particle Size, Dv90* | 0.44 | 1.60 | 1.69 | 1.62 | 2.05 |
| Property cured system | | | | | |
| Tg (° C.)** | — | 95 | 106 | 108 | 116 |

*by Coulter (microns)
**20 min cure at 200° C. and 0.5 phr 2-methyl imidazole
% expressed as wt/wt %

From the above example it is clear that the ratio epoxy/phenolic novolac resin ratio has an influence on the cured Tg of the formulation. The more the epoxy resin level used in the formulation (compare ex 2, 3 and 4) the lower the level of the surface active agent is needed to achieve a co-dispersion with nearly the same particle size distribution.

Storage stability was done according to the following procedure:
Co-dispersions, stored at 20° C., were regularly checked on particle size by Coulter Volume % (Dv and Dv90).

TABLE 2 physical storage stability of the co-dispersions

|  | Particle size (as produced) | | | | Particle size (when verified) | |
|---|---|---|---|---|---|---|
| Ex. | Dv | Dv90 | Surf. Conc. | Days of storage | Dv | Dv90 |
| 1 | 0.29 | 0.44 | 10.5 | 173 | 0.27 | 0.43 |
| 2 | 0.95 | 1.60 | 7.5 | 169 | 0.96 | 1.64 |

TABLE 2-continued physical storage stability of the co-dispersions

| | Particle size (as produced) | | | | Particle size (when verified) | |
|---|---|---|---|---|---|---|
| Ex. | Dv | Dv90 | Surf. Conc. | Days of storage | Dv | Dv90 |
| 3 | 0.97 | 1.69 | 5.0 | 345 | 0.96 | 1.56 |
| 4 | 0.99 | 1.62 | 5.0 | 114 | 0.97 | 1.56 |
| 5 | 1.40 | 2.05 | 5.0 | 98 | 1.40 | 2.06 |

TABLE 3 chemical storage stability of co-dispersion example 3

| | | Initial | After 6 months |
|---|---|---|---|
| Co-dispersion (ex 3) | g | 20.00 | 20.00 |
| 2-MI (W 10), 0.5 phr | g | 0.59 | 0.59 |
| Demi water | g | 19.11 | 19.11 |
| Solids | % | 30.0 | 30.0 |
| HPGT @ 150° C. (1 min holding) | seconds | 174 | 186 |

The formulations made according to the composition and the process of the invention fulfill the wishes and need of the industry standards in terms of stability and reactivity. The above composition could be used for heat cure coating (on metal, paper, wood, plastics), fiber sizing, adhesive, binder for abrasive, saturant for filter (fibers, paper) woven and non-woven binder applications.

We claim:

1. A process to make an organic solvent free aqueous co-dispersion of epoxy resins and phenolic novolac resins, the organic solvent free process comprising the steps of:
    (a) heating the epoxy resins to a temperature ranging from 80° C. to 120° C.;
    (b) at a temperature below 100° C., adding a surface active agent and an inversion water quantity; and
    (c) at a temperature below 100° C., adding the phenolic novolac resins and dilution water.

2. The process of claim 1, wherein a blend of the epoxy and phenolic novolac resins has a melt viscosity range of 1 500 000 to 300 mPas at 80° C. and 10 000 to 20 mPas at 120° C.

3. The process of claim 1, wherein a blend of the epoxy and phenolic novolac resins has a melt viscosity range of 250 000 to 100 mPas at 90° C. and 20 000 to 30 mPas at 110° C.

4. The process of claim 1, wherein the surface active agent is a polymer with free hydroxyl groups.

5. The process of claim 1, wherein the surface active agent is a polymer based on partially hydrolyzed polyvinyl alcohol.

* * * * *